June 25, 1935.   J. H. ASHBAUGH   2,005,883
REGULATING SYSTEM
Filed July 20, 1933
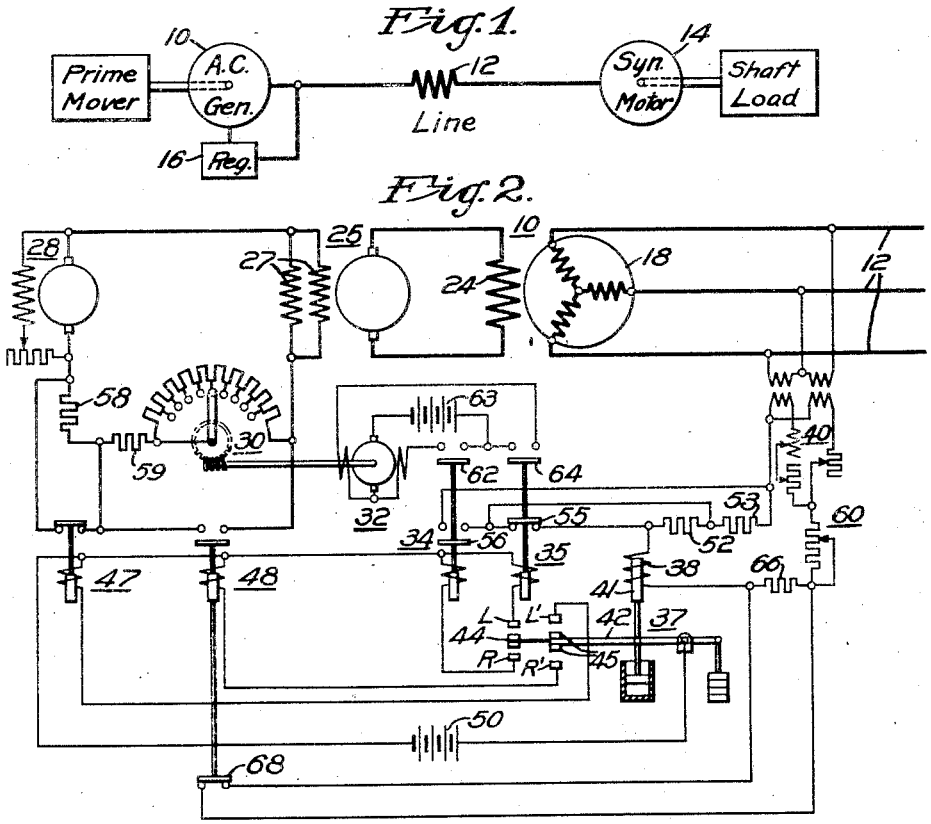
WITNESSES:
INVENTOR
John H. Ashbaugh.
BY
ATTORNEY Patented June 25, 1935

2,005,883

UNITED STATES PATENT OFFICE 2,005,883

REGULATING SYSTEM

John H. Ashbaugh, Longmeadow, Mass., assignor to Westinghouse Electric & Manufacturing Company, East Pittsburgh, Pa., a corporation of Pennsylvania Application July 20, 1933, Serial No. 681,296

4 Claims. (Cl. 171—119)

My invention relates to regulators for dynamo-electric machines and it has particular relation to means for increasing the effectiveness of automatic voltage regulators utilized with electrical power systems involving interconnected synchronous machines.

Upon the occurrence of system disturbances which demand a quick response on the part of the regulator to increase the machine excitation, it is desirable to effect an increase in excitation at the highest possible rate and preferably to continue it until the voltage is restored to substantially its normal value. This last named action is opposite in direction to that required to effect anti-hunting of the regulator, and since anti-hunting action is required on all regulators, the regulator is arranged to so operate as to discontinue the rapid excitation increase prior to the voltage reaching its normal value. Thus, as regards the maintenance, under transient conditions of the system, of stability and high power transmitting capacity, the effects of the quick-response characteristics which such a regulating system may possess are materially reduced by the anti-hunting action of the regulator.

My invention is directed to simple and effective means for overcoming this disadvantage in the operation of automatic voltage regulators when applied to synchronous machines.

Generally stated, it is an object of my invention to increase the power limits of electrical circuits connecting alternating current systems involving synchronous machines which are controlled by automatic voltage regulators.

One object of my invention is to provide means for causing an automatic voltage regulator to increase the excitation of a synchronous machine controlled thereby continuously at the high rate demanded by a system disturbance until the machine voltage has been completely restored to normal.

A further object of my invention is to provide means whereby the voltage setting of an automatic regulator utilized with a dynamo-electric machine may be raised during the continuance of a reduction in the machine voltage below a given value.

In practicing my invention, I provide means for increasing the setting of the automatic voltage regulator, which device is made effective whenever the voltage of the regulator-controlled machine drops to a predetermined low value. Once the adjustor is thus made effective the higher setting allows the regulator to completely correct the machine voltage back to the desired value before a reduction in the rate of correction is instituted, and in this manner the possibility of the machine falling out of synchronism is materially reduced and the stability of the power system is thereby substantially improved.

My invention, together with additional objects and advantages thereof, will best be understood through the following description of specific embodiments when taken in conjunction with the accompanying drawing in which:

Figure 1 is a single line diagrammatic representation of a power system comprising a synchronous machine to which the improved automatic voltage regulator control of my invention is adapted, and Fig. 2 is a diagrammatic view of apparatus and circuits illustrating one preferred form of my invention applied to an automatic voltage regulator which controls the excitation of a synchronous generator forming a part of the power transmission system of Fig. 1.

Referring to the drawing and particularly to Fig. 1 thereof, the power system there illustrated comprises a prime-mover driven alternating-current generator 10 which is connected through a line or transmission circuit 12 to a synchronous motor 14 which drives a shaft load. To control the excitation of generator 10, an automatic regulator, designated generally at 16, is utilized.

It is recognized that the ability of a synchronous machine to stay in step with the voltage of the alternating current circuit to which it is connected is a function of the machine excitation, high values of excitation requiring high torques to effect pull-out or loss of synchronism and low values of excitation offering correspondingly smaller resistance to machine pull-out. Consequently, it is desirable in a power system of the type under consideration to assure that the machine excitation is increased at the highest possible rate upon the occurrence of a system disturbance. To obtain this desirable result I provide the special means illustrated in Fig. 2.

The power transmission system shown in Fig. 2 is a more detailed reproduction of the generator end only of the complete system shown in Fig. 1, it comprising the alternating current generator 10, illustrated as having armature windings 18 directly connected with the conductors of a three-phase transmission circuit 12. The generator is provided with a field winding 24 which is energized from an exciter generator 25. This main exciter 25 is provided with a field winding 27, shown as being of the parallel path type to reduce inductive lag, which may be energized from any suitable source of substantially constant direct-current potential such as an auxiliary or pilot exciter 28.

To control the voltage of the regulated generator 10, a motor operated rheostat 30 is connected in circuit with the exciter field winding 27 to control the field current, and hence the voltage impressed by the exciter 25 upon the winding 24 of the generator 10. This rheostat is operated by a suitable reversible motor 32 the energization of which is controlled by the actuation of relays 34 and 35, which respectively cause the motor to be operated in the voltage-raising and the voltage-lowering directions.

Relays 34 and 35 are controlled by means of a contact making volt-meter or primary relay 37 that is responsive to the potential impressed upon an operating winding 38 thereof. This winding is energized by the terminal voltage of machine 10 through a positive phase sequence network 40. The network is for the purpose of supplying to the winding a single phase voltage which at all times is proportional to the positive-phase-sequence component of the three single-phase voltages acting in the three-phase circuit 12. Such networks, which are well known in the art, are more completely shown and described in United States Patent 1,571,224 granted February 2, 1926 to C. T. Allcutt.

Thus an increase in the voltage of the machine 10 increases the upwardly acting magnetic pull upon the armature member 41 of relay 37 and causes the contact-carrying arm 42 of the relay to be moved upwardly while a decrease in generator voltage similarly allows the arm 42 to move downwardly.

In order that the regulating system may respond quickly to correct large variations in voltage, provision is made through the utilization of contactors 47 and 48, respectively, for short-circuiting from, and for inserting in, the field control circuit relatively large blocks of resistance. Contactor 47 for example, when in its normal circuit-closing position illustrated, establishes a shunt connection around a resistor 58. Likewise, contactor 48 is disposed to short-circuit the field rheostat 30 and a resistor 59 when the contactor is actuated to its circuit-closing position.

Relay device 37 is provided with two separate sets of contacts, a set for effecting a small voltage change comprising members L, 44 and R, and a set for effecting a large voltage change comprising members L', 45 and R'. The small-change-responsive contacts function to control the motor-control relays 34 and 35 and the large-change-responsive contacts control the actuation of the resistor shunting contactors 47 and 48. A battery 50 is shown as a source of energization for the control circuits just named.

To change the voltage which the regulator will maintain at the terminals of the machine 10, the usual voltage-adjusting rheostat 60 is included in the energizing circuit of primary relay 37. An increase in the resistance of the rheostat 60 causes the regulator to maintain a higher generator voltage while a decrease in rheostat resistance similarly lowers the voltage.

In the operation of the regulating system thus far described, a decrease in the voltage of the generator 10 causes the contact member 44 of the primary relay 37 to be lowered into engagement with the stationary member R thereby completing a circuit from battery 50 which effects the actuation of the relay 34. This relay accordingly moves its contact members upwardly completing a circuit through contact member 62 for energizing the rheostat operating motor 32 from a battery 63 in such manner that the motor operates the rheostat 30 in the resistance-lowering direction to thereby effect an increase in the excitation of the machine 10 to increase the machine voltage to its desired value.

Similarly, an increase in the voltage of machine 10 causes the primary relay 37 to move the contact member 44 thereof upwardly into engagement with a stationary member L, thereby completing an actuating circuit for the relay 35 from the energizing source 50. This relay moves its contact members upwardly, completing through member 64 a circuit for energizing, from source 63, motor 32 in a manner that it adjusts rheostat 30 in the resistance increasing direction to effect a reduction in the excitation and voltage of machine 10.

For the purpose of preventing hunting during the operation of the regulator, auxiliary resistor sections 52 and 53 are disposed in the energizing circuit of the contact making voltmeter 37. Normally, section 52 is shunted from the circuit by means of an auxiliary contact member 55 carried by motor-control relay 35, while the resistor 53 is shunted from the circuit by an auxiliary contact member 56 only upon the actuation of the motor-control relay 34. These anti-hunting resistors serve to anticipate the voltage changes at the terminals of machine 10 effected by adjusting operations of rheostat 30 and thus cause the operations to be discontinued somewhat before the voltage correction has completely reached the desired value.

In the event that the voltage of machine 10 suddenly drops to an abnormally low value sufficient to effect the engagement of contact member 45 of relay 47 with stationary member R', there is completed through these members an actuating circuit for contactor 48 which functions to establish a shunt connection around rheostat 30 and resistor 59 to thereby rapidly increase the voltage applied to the field windings 27 of exciter 25. This rapid excitation increase continues until such time as the voltage of machine 10 has risen above the predetermined low value, at which time the contact member 45 of relay 37 interrupts the actuating circuit of short-circuiting contactor 47 and restores the excitation control to motor-operated rheostat 30.

In a similar manner, an unusually large rise in the voltage of the machine 10 completes through contact members 45 and L' of device 37 an actuating circuit for contactor 47 which contactor functions to remove a normally maintained shunt connection around resistor 58, and thus allows the resistor to become effective in the excitation control circuit to reduce the current supplied to exciter windings 27. The resulting rapid reduction in machine excitation continues until the machine voltage has been reduced below the predeterminedly large value mentioned at which time the excitation control is restored to the motor operated rheostat 30.

My invention, as applied to the system just described, resides in the provision of means for raising the voltage setting of the regulator upon the occurrence of predeterminedly large decreases in regulator voltage in order that the rapid increase in machine excitation may be continued until the machine voltage has been corrected completely to the desired value rather than being interrupted somewhat in advance as is effected by the regulating equipment thus far considered. To accomplish this result I provide in the voltage supply circuit for the control element of the regulator an auxiliary resistor or other impedance element which is made active to raise the voltage setting of the regulator only upon the occasion of the abnormal voltage drop referred to. In the system of Fig. 2 this auxiliary resistor is illustrated at 66 as being connected intermediate the positive phase sequence network 40 and the operating winding 38 of the primary relay 37 to which the network supplies a single phase voltage proportional to the potential of the circuit or machine regulated voltage.

Normally, the resistor 66 is short-circuited by a contact member 68 carried by the resistor-shunting contactor 48. Upon the upward movement of the contactor 48, which, as has been explained, takes place only when the machine voltage drops to a predetermined low value and which functions to rapidly increase the machine excitation, contact member 68 interrupts the shunt connection around the resistor 66, inserting it in the regulator supply circuit.

As the result of the insertion of the resistor 66 into this supply circuit, the potential impressed upon the winding 38 of the relay 37 is so reduced that to maintain it at the constant value required to effect disengagement of the movable contact members 44 and 45 of the relay, the voltage of the generator 10 and the circuit 12 must be correspondingly increased, which requires that the excitation of the machine 25 be similarly increased. Hence, by properly proportioning the resistor 66, the voltage setting of the regulator may be so raised that rheostat-shunting contactor 48 will remain closed until the generator voltage has completely returned to its desired value. Upon such correction the primary relay will function to cause the contactor 48 to return to the position illustrated, in which the short circuit about the rheostat 30 has been removed and the connection in shunt to the special resistor 66 is reestablished by the contact member 68.

The voltage setting of the regulator being, by this action, returned to the normal value, the operation of the complete regulating system is further unaffected until a recurrence of the machine voltage drop which effects the actuation of contactor 48 and causes a repetition of the operation just detailed.

It will be appreciated that the additional equipment employed in the regulator adjusting means of my invention is exceedingly small and inexpensive, the embodiment of Fig. 2 requiring only the auxiliary resistor 66, its shunting contact member 68 actuated by the rheostat shunting contactor 48, and the interconnecting circuits. The operation, furthermore, is positive and exceedingly reliable.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, a dynamo-electric machine, means for adjusting the excitation of said machine, regulator means responsive to the voltage of said machine for controlling said excitation adjusting means, means for raising the voltage setting of the regulator, and means actuated by said regulator for making effective said setting-raising means upon the occurrence and for the duration of a predeterminedly large drop in machine voltage.

2. In a system comprising a dynamo-electric machine, a voltage regulator disposed to control the excitation of said machine, means comprised by said regulator for increasing said excitation at an exceedingly high rate upon the occurrence of a predetermined large drop in the voltage of said machine, and means responsive to the actuation of said last-named means for raising the voltage-setting of the regulator.

3. In a system comprising a dynamo-electric machine, excitation-adjusting means therefor, a regulator for controlling said excitation- adjusting means in accordance with variations from a desired value in the voltage of said machine, a contactor disposed when actuated to rapidly increase the machine excitation, means controlled by the regulator for actuating said contactor upon the occurrence of a predetermined large drop in machine voltage, and means responsive to the actuation of said contactor for raising the voltage setting of said regulator.

4. A regulating system for a dynamo-electric machine having an excitation-supply circuit, a rheostat for controlling the current in said circuit, a motor for operating said rheostat, a contactor for establishing a shunt connection around said rheostat, a regulator device, sensitive to changes in the voltage of said machine, for controlling said rheostat-operating motor, and for effecting the closing of said contactor when the machine voltage drops to a predetermined low value, and means effective upon the closing of said contactor for raising the voltage setting of said regulator device.

JOHN H. ASHBAUGH.